(12) United States Patent
Weiss

(10) Patent No.: US 9,868,183 B2
(45) Date of Patent: Jan. 16, 2018

(54) ROTARY INDEXING TABLE HAVING A DIRECT DRIVE OF THE TRANSPORT CAM

(75) Inventor: Uwe Weiss, Buchen-Boedigheim (DE)

(73) Assignee: WEISS GMBH, Buchen (ODW) (DE)

( * ) Notice: Subject to any disclaimer, the term of this patent is extended or adjusted under 35 U.S.C. 154(b) by 108 days.

(21) Appl. No.: 13/501,420

(22) PCT Filed: Oct. 15, 2010

(86) PCT No.: PCT/EP2010/006320
§ 371 (c)(1),
(2), (4) Date: Jun. 25, 2012

(87) PCT Pub. No.: WO2011/045077
PCT Pub. Date: Apr. 21, 2011

(65) Prior Publication Data
US 2012/0266721 A1 Oct. 25, 2012

(30) Foreign Application Priority Data

Oct. 16, 2009 (DE) .................. 10 2009 049 618
Oct. 16, 2009 (DE) .................. 20 2009 014 041 U

(51) Int. Cl.
*B23Q 16/02* (2006.01)
*B23Q 1/52* (2006.01)

(52) U.S. Cl.
CPC .......... *B23Q 16/025* (2013.01); *B23Q 1/522* (2013.01); *B23Q 2220/004* (2013.01); *Y10T 74/14* (2015.01)

(58) Field of Classification Search
CPC ...... B23Q 1/522; B23Q 16/025; B23Q 16/02; B23Q 16/01

USPC ................................................. 74/813 R
See application file for complete search history.

(56) References Cited

U.S. PATENT DOCUMENTS

| | | | | |
|---|---|---|---|---|
| 3,153,355 A | * | 10/1964 | Opperthauser et al. | 269/57 |
| 3,175,294 A | * | 3/1965 | Khokhlov | B23Q 16/02 33/1 PT |
| 3,533,309 A | * | 10/1970 | Pityo et al. | 74/813 R |
| 3,829,076 A | * | 8/1974 | Sofy | 269/57 |
| 4,635,507 A | * | 1/1987 | Kojima | B23Q 16/025 74/426 |
| 4,822,182 A | * | 4/1989 | Matsushita | F16C 33/748 384/107 |

(Continued)

FOREIGN PATENT DOCUMENTS

CN 2032522 U 2/1989
CN 1500589 A 6/2004

(Continued)

OTHER PUBLICATIONS

EPO Machine Translation of DE 102007021681, Konen, Sep. 2008.*

(Continued)

*Primary Examiner* — Vinh Luong
(74) *Attorney, Agent, or Firm* — Amster, Rothstein & Ebenstein LLP

(57) ABSTRACT

A rotary index table comprising a plate, which has drivers that engage with a drive groove of a cam barrel, wherein the plate can be driven by the cam barrel to carry out a rotational movement about a rotational axis which in turn can be driven by a motor to carry out a rotational movement about the longitudinal axis thereof, and wherein the motor directly drives the cam barrel.

3 Claims, 1 Drawing Sheet

(56) References Cited

U.S. PATENT DOCUMENTS

| | | | | |
|---|---|---|---|---|
| 5,239,892 | A | * | 8/1993 | Sakai ................... B23Q 1/28 108/139 |
| 5,609,061 | A | | 3/1997 | Moller ........................ 74/120 |
| 6,601,470 | B2 | * | 8/2003 | Kato ........................... 74/567 |
| 6,941,646 | B2 | * | 9/2005 | Suhara ............ H05K 13/0069 29/739 |
| 6,955,345 | B2 | | 10/2005 | Bohner |
| 2002/0040519 | A1 | * | 4/2002 | Hattori ................ H05K 3/0008 29/650 |
| 2002/0047313 | A1 | * | 4/2002 | Aoshima ............... H02K 37/14 310/10 |
| 2005/0254914 | A1 | * | 11/2005 | Kato ................... B23Q 1/0009 409/221 |
| 2006/0266031 | A1 | * | 11/2006 | Kosaka ................. G02B 7/102 60/527 |
| 2007/0039415 | A1 | | 2/2007 | Weiss |
| 2007/0137433 | A1 | * | 6/2007 | Amendolea ........... B23Q 16/02 74/813 C |
| 2007/0234849 | A1 | * | 10/2007 | Kato ......................... 74/813 L |
| 2007/0296312 | A1 | * | 12/2007 | Yasuda ................. H02K 37/20 310/12.24 |
| 2008/0125904 | A1 | * | 5/2008 | Osaki et al. .................. 700/170 |
| 2010/0123278 | A1 | * | 5/2010 | Tatsuda ............... B23Q 16/102 269/57 |
| 2010/0275726 | A1 | * | 11/2010 | Tatsuda ................ B23Q 1/287 74/813 R |
| 2011/0273789 | A1 | * | 11/2011 | Knoedgen ............. G05B 19/19 359/824 |
| 2011/0277603 | A1 | * | 11/2011 | Uchimura ................ B23B 5/08 82/159 |
| 2012/0255397 | A1 | * | 10/2012 | Weiss ........................ 74/813 R |
| 2013/0036864 | A1 | * | 2/2013 | Horn ..................... B23Q 15/26 74/816 |
| 2014/0312548 | A1 | * | 10/2014 | Yoshida .................. B23Q 1/48 269/58 |

FOREIGN PATENT DOCUMENTS

| | | | |
|---|---|---|---|
| CN | 1628932 | A | 6/2005 |
| CN | 1759983 | A | 4/2006 |
| CN | 201055957 | Y | 5/2008 |
| CN | 201102110 | Y | 8/2008 |
| CN | 101391377 | A | 3/2009 |
| DE | 102005038663 | A1 | 2/2007 |
| DE | 102006061310 | A1 | 7/2008 |
| DE | 102007021681 | B3 | 9/2008 |
| EP | 0 256 960 | * | 2/1988 ............... B23Q 1/16 |
| EP | 1300216 | A2 * | 4/2003 |
| EP | 1754566 | A1 | 2/2007 |
| GB | 902991 | * | 9/1962 ............. B23Q 1/522 |
| GB | 1025021 | * | 4/1996 ................. 74/813 R |
| JP | 62-19349 | * | 1/1987 ................. 74/813 R |
| JP | H10225085 | A * | 8/1998 |
| JP | 2005186192 | | 7/2005 |

OTHER PUBLICATIONS

English Abstract of JP 62-19349, Kobayashi, Jan. 1987.*
EPO Machine Translation of CN201102110 Y, Fengmei Shen, Aug. 20, 2008.*
Translation of CN200810201962, Hongping et al., Mar. 25, 2009.*
Translation of CN88210863, Zaiyong, Feb. 15, 1989.*
English Abstract of EP 1300216 A2, Korlschem et al., Apr. 2003.*
Derwent English Abstract of JPH10225085 (A), Kawakami et al., Aug. 1998.*
German Search Report corresponding to German Patent Application No. 20 2009 014 041.5 dated Aug. 23, 2010.
International Search Report corresponding to International Application No. PCT/EP2010/006320 dated Feb. 14, 2011.
Catalog of the company Weiss GmbH issued in 2002, printing date Feb. 2002; (D3).
Catalog of the company Fibro GmbH issued in 1983, edition 04; (D4).
Technical report published in antriebstechnik, edition Feb. 2005: "Direktantriebe passend ausgewahlt" by Prof. Dr.-Ing. Detmar Zimmer, also published on Wissensportal baumaschine.de Jan. 2005; (D5).
Conference proceedings: "Lineardirektantriebe in Werkzeugmaschinen" published on the occasion of the 14th Dresden Technical Seminar on Machine Tools; (D6).
Article published in baumaschine.de Jan. 2005 "Direktantriebe passend ausgewahlt—Elektromagnetische Direktantriebe im Vergleich"; (D7).
VDI Report No. 2004/2007: "Torquemotoren mit zylindrischen Wellen oder Hohlwellen verbinden"; by E. Fritzemeier, VDI; (D8).
Technical publication OS/2004: Der Konstrukteur; title: Antriebstechnik; "Hohlwellenantrieb hat sich bewahrt" by Dr. Rolf Slatter and Ellen Slatter; (D9).
English translation of Abstracts D4, D5, D6, D7, D8 and D9.
Fertigungs-Auftrag (production order, including drawing and parts list) dated Mar. 26, 1985.

* cited by examiner

ROTARY INDEXING TABLE HAVING A DIRECT DRIVE OF THE TRANSPORT CAM

FIELD OF THE INVENTION

The present invention relates to a rotary indexing table having a plate which has drivers engaging into a driving groove of a barrel cam. The plate is drivable via a barrel cam to make a rotary movement about an axis of rotation which is in turn drivable by a motor to make a rotational movement about its longitudinal axis.

BACKGROUND OF THE INVENTION

Such rotary indexing tables are widely used, inter alia in assembly technology and automation technology. Workpieces are, for example, arranged on the plate which are set into continuous or clocked rotational movements for their machining and/or assembly. In this respect, the precision of the rotary indexing table is of special significance so that the workpiece always has well-defined positions/orientations relative to the assembly tools/machining tools. The precision of the apparatus results from the accuracy with which the plate can adopt the individual machining positions as well as from the precision of the rotational movement of the plate between the machining positions.

SUMMARY OF THE INVENTION

It is therefore an object of the present invention to provide a rotary indexing table which allows a reliable and precise rotational movement of the plate.

This object is satisfied by a rotary indexing table having the features of claim 1.

The rotary indexing table in accordance with the invention of the initially named kind is characterized in that the motor directly drives the barrel cam. A direct drive is to be understood such that no transmission is arranged between the motor and the barrel cam. The motor is, for example, flanged directly to the barrel cam (transport cam) or is only connected thereto by a shaft. The friction losses which always occur in the interior of a transmission are thereby avoided. In addition, any clearance in the transmission has a disadvantageous effect on the precision of the rotary indexing table. Such a transmission therefore has to be designed with low clearance, which is only possible with a large effort and is therefore expensive. In other words, the control of the barrel cam is simplified and made more precise by the direct drive, i.e. by the omission of a transmission and by a drive torque transfer from the motor to the barrel cam without "diversions".

Further embodiments of the present invention are set forth in the description, in the drawings and in the dependent claims.

A compact construction of simple design provides a coaxial arrangement of the barrel cam and of the motor.

In accordance with a further embodiment of the present invention, the motor is an asynchronous motor. This embodiment is in particular suitable for rotary indexing tables in which cost factors play a role and compromises can be made in the precision of the rotational movement of the plate. These compromises can be minimized by a suitable regulation of the asynchronous motor.

Provision can be made that the motor is a torque motor which directly drives the barrel cam. Torque motors are—in simplified terms—large (multi-pole) motors optimized for high torques and having a hollow shaft. As a rule, they deliver comparatively small rotational drive speeds. These properties are particularly suitable for a rotary indexing table since usually no high rotational speeds of the turntable are required, but they should normally be driven with a high driving torque. Direct drives of a turntable by means of a torque motor are admittedly known; however, such rotary indexing tables are special designs which are only used in specific application fields. In the present embodiment, the drive of the turntable takes place via the barrel cam which is in turn driven by a torque motor. On a drive of the barrel cam by a torque motor, existing design principles can largely be made use of. Only the drive of the barrel cam is modified/replaced.

In accordance with a further development of this embodiment, the barrel cam has a prolongation which substantially has the diameter of the barrel cam and has the functional components of the torque motor. The barrel cam itself thus comprises a section which is not reduced in cross-section in comparison with the section having the driving groove. In other words, the prolongation forms an extension section of the barrel cam without a driving groove. The prolongation is simultaneously the rotor of the torque motor, i.e. the prolongation of the barrel cam has the components required for the operation of the torque motor. These components can be magnets or coils, for example.

The described construction represents the "most direct" construction of a direct drive of the barrel cam since a drive shaft for transmitting the driving torque from the motor to the barrel cam can also be dispensed with.

BRIEF DESCRIPTION OF THE DRAWINGS

The invention will be described in the following purely by way of example with reference to advantageous embodiments and to the drawings. There are shown.

DETAILED DESCRIPTION

Figure 1:
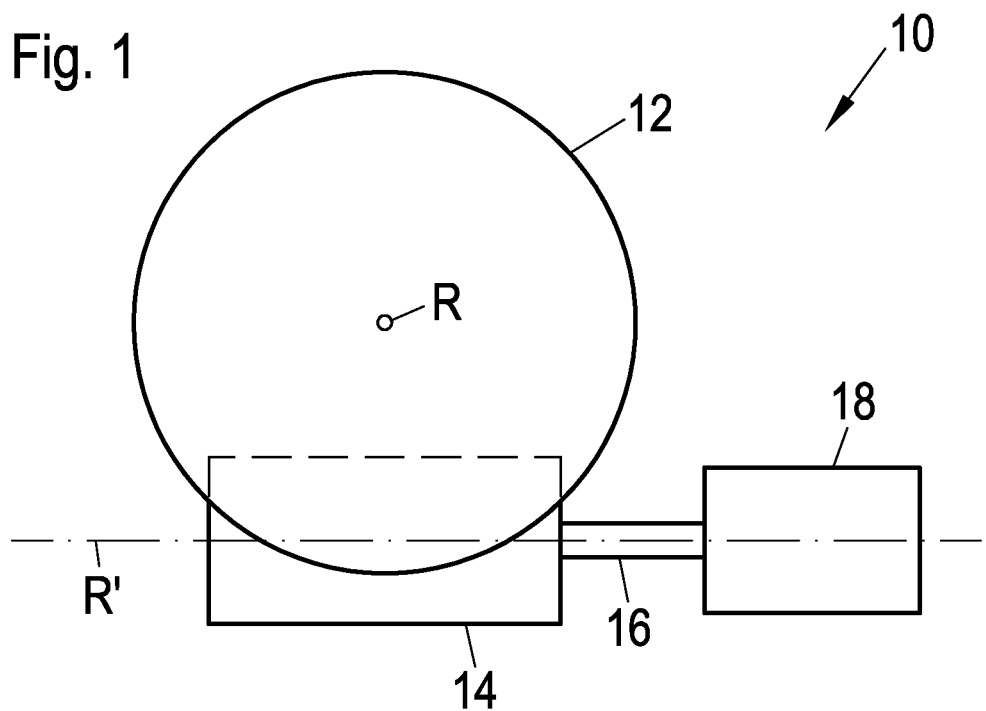
FIG. 1 a schematic view of an embodiment of a rotary indexing table in accordance with the invention from above.

FIG. 1 schematically shows a rotary indexing table 10 which has a turntable 12 on which workpieces can be spanned for machining and/or assembly. The turntable 12 is driven by a barrel cam 14 to make a rotational movement about an axis of rotation R which extends perpendicular to the plane of the Figure. To transmit a drive movement of the barrel cam 14, which is a rotation of the barrel cam 14 about an axis of rotation R' perpendicular to the axis of rotation R, onto the turntable 12, the latter has drivers (not shown in FIG. 1) which engage in a form known per se into a driving groove (not shown in FIG. 1) having a constant or varying pitch and running spirally about the barrel cam 14.

The barrel cam 14 is rotationally fixedly connected to a drive shaft 16. The drive shaft 16 is simultaneously the output shaft of a motor 18 which is, for example, electrically driven.

In the rotary indexing table 10, the barrel cam 14 and the motor 18 are arranged coaxially, i.e. both the motor 18 and the drive shaft 16 as well as the barrel cam 14 rotate about the common axis of rotation R' in operation.

It can be seen from FIG. 1 that the drive of the barrel cam 14 takes place in a direct manner, i.e. without a transmission interposed between the motor 18 and the barrel cam 14.

Only the drive shaft 16 is provided to transmit a driving torque between the two named components.

In principle any motor—also of a non-electric construction—can be used as the motor 18, such as asynchronous motors or synchronous motors.

Figure 2:
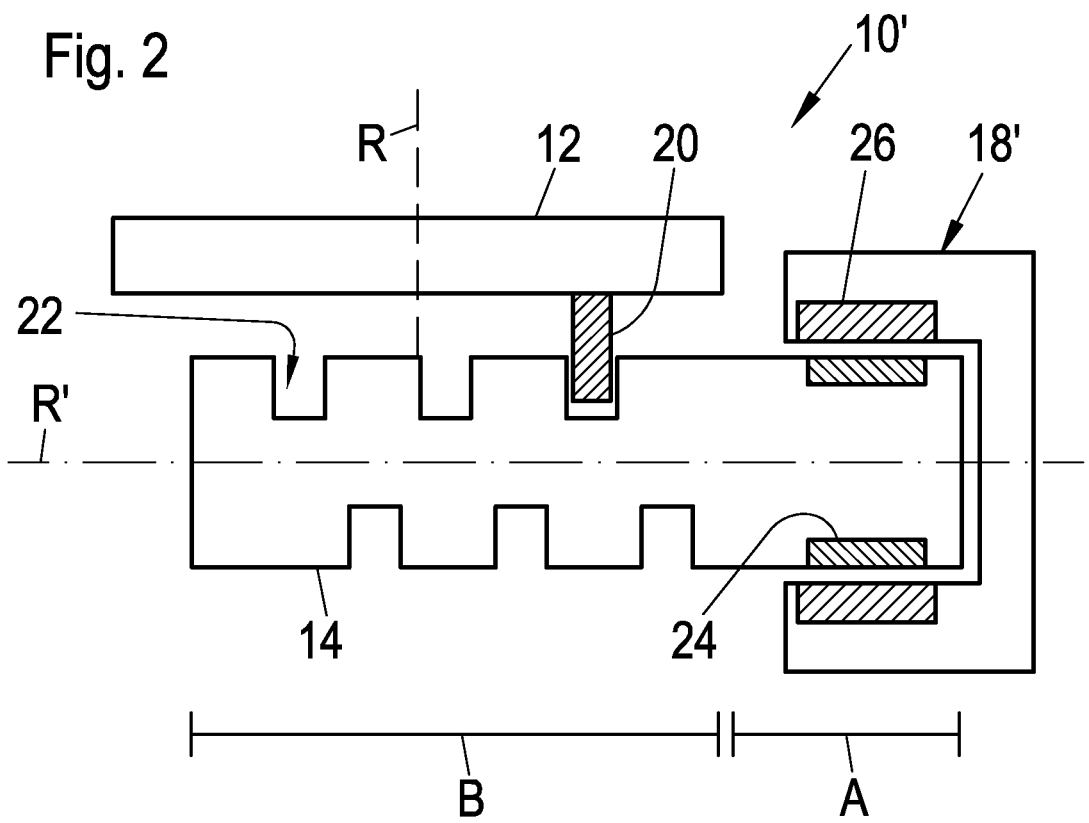
FIG. 2 a cross-section through a further embodiment of a rotary indexing table in accordance with the invention.

FIG. 2 shows a cross-section through a further embodiment 10' of the rotary indexing table. It can be recognized in the left hand part of the drawing how a driver 20 of the turntable 12 engages into a driving groove 22 of the barrel cam 14. The representation of this known drive concept is only shown in highly simplified form.

The right hand part of FIG. 2 comprises the drive components of the barrel cam 14. In contrast to the embodiment shown in FIG. 1, the drive of the rotary indexing table 10' has no drive shaft 16. The barrel cam 14 rather itself forms a part of the motor 18' which is made as a torque motor. The barrel cam 14 has (electric) magnets 24 at an extension section A which cooperate with coils 26 of the torque motor 18'. In other words, the extension section A is the rotor of the torque motor 18' which is directly connected to a section B of the barrel cam 14 having the driving groove 22. The sections A, B are consequently integral components of the barrel cam 14. The section B of the barrel cam 14 can also be called—relative to the extension section A—an extension of the rotor of the torque motor 18'. The extension section A has substantially the same diameter as the section B of the barrel cam 14 provided with the driving groove 22.

The embodiment of the drive of the rotary indexing table 10' shown schematically in FIG. 2 is characterized by a compact construction and a precise drive of the barrel cam 14. Expensive transmission elements suffering from friction/clearance are not used.

REFERENCE NUMERAL LIST 10, 10' rotary indexing table
12 turntable
14 barrel cam
16 drive shaft
18 motor
18' torque motor
20 driver
22 driving groove
24 magnet
26 coil
R, R' axis of rotation
A extension section
B groove section

The invention claimed is:

1. A rotary indexing table having a plate which has drivers engaging into a driving groove of a barrel cam, wherein the plate is driven via the barrel cam to make a rotary movement about an axis of rotation which is in turn driven by a torque motor to make a rotational movement about its longitudinal axis, wherein
the torque motor comprises magnets that cooperate with corresponding coils to generate a driving force to directly drive the barrel cam without a transmission,
the barrel cam has a prolongation which has a same outer diameter as that of the barrel cam and the magnets of the torque motor are disposed on the prolongation of the barrel cam, and
the prolongation and the barrel cam are unitary components.

2. A rotary indexing table in accordance with claim 1, wherein
the barrel cam and the motor are coaxially arranged.

3. A rotary indexing table in accordance with claim 1, wherein the motor is an asynchronous motor.

* * * * *